(12) United States Patent
Cholley et al.

(10) Patent No.: US 8,535,515 B2
(45) Date of Patent: Sep. 17, 2013

(54) HYDROTREATING AND/OR HYDROCRACKING CATALYST OF HYDROCARBONS AND PREPARATION THEREOF

(75) Inventors: Thierry Cholley, Brussels (BE); Jean-Pierre Dath, Beloeil Hainaut (BE)

(73) Assignee: Total France, Puteaux (FR)

( * ) Notice: Subject to any disclaimer, the term of this patent is extended or adjusted under 35 U.S.C. 154(b) by 2189 days.

(21) Appl. No.: 10/567,564

(22) PCT Filed: Aug. 4, 2004

(86) PCT No.: PCT/FR2004/002085
§ 371 (c)(1),
(2), (4) Date: Jan. 8, 2007

(87) PCT Pub. No.: WO2005/016518
PCT Pub. Date: Feb. 24, 2005

(65) Prior Publication Data
US 2007/0114155 A1      May 24, 2007

(30) Foreign Application Priority Data
Aug. 8, 2003 (FR) ..................................... 03 09768

(51) Int. Cl.
*B01J 23/882* (2006.01)
(52) U.S. Cl.
USPC .................. 208/111.3; 208/111.35; 208/112; 208/216 R; 208/217; 208/254 H; 502/150; 502/313

(58) Field of Classification Search
USPC ............. 208/111.3, 111.35, 112, 216 R, 217, 208/254 H; 502/150, 313
See application file for complete search history.

(56) References Cited

U.S. PATENT DOCUMENTS

| | | | | |
|---|---|---|---|---|
| 3,526,645 A | * | 9/1970 | Vangermain et al. | 549/529 |
| 3,544,485 A | * | 12/1970 | Taira et al. | 560/265 |
| 3,978,001 A | * | 8/1976 | Meyer | 502/261 |
| 4,693,991 A | * | 9/1987 | Bjornson et al. | 502/220 |
| 5,648,305 A | * | 7/1997 | Mansfield et al. | 502/27 |

FOREIGN PATENT DOCUMENTS

| | | |
|---|---|---|
| EP | 0 181 035 A1 | 5/1986 |
| EP | 1 043 069 A1 | 10/2000 |
| WO | WO 95/32801 A1 | 12/1995 |
| WO | WO 02/24836 A1 | 3/2002 |

OTHER PUBLICATIONS

Howard Maskill, Mechanisms of Organic Reactions, New York, Oxford University Press Inc., 1996, p. 62.*

* cited by examiner

*Primary Examiner* — Randy Boyer
(74) *Attorney, Agent, or Firm* — Sughrue Mion, PLLC

(57) ABSTRACT

The invention relates to a hydroconversion catalyst, which comprises a refractory oxide support, at least one metal selected from group VIII and at least one metal selected from group VIB and which is characterized in that it has at least one organic compound containing at least one oxime group of formula (I)>C=$NOR_1$, in which $R_1$ is selected among hydrogen and alkyl, allyl, aryl, alkylene or cycloaliphatic groups, and combinations thereof, these groups being able to be substituted by at least one electron donor group.

15 Claims, No Drawings

HYDROTREATING AND/OR HYDROCRACKING CATALYST OF HYDROCARBONS AND PREPARATION THEREOF

This invention pertains to a hydroconversion catalyst, the method for preparing it and the use of this catalyst in a hydrotreating and/or hydrocracking process for hydrocarbons, particularly those from petroleum fractions with boiling points preferably between 40 and 560° C.

Currently, the demand for desulfurized, denitrogenized, dearomatized hydrocarbon compounds is increasing and many studies have been conducted in order to develop catalysts that are increasingly effective for purifying hydrocarbons. However, these new catalysts are much more costly and are only accessible to a limited number of producers. In addition, from the first time these catalysts are regenerated, their activity level is much lower than their initial activity level in new condition under the same operative conditions. Only additional specific rejuvenation processing sometimes makes it possible to attain this initial activity level once again and therefore to obtain sulfur contents of less than 10 ppm.

Today, many "traditional" refractory oxide medium-based catalysts containing combinations of metals from groups VIB and VIII are used in refineries in new or regenerated condition either for hydrotreating or for hydrocracking. Although it is impossible to increase their desulfidation and/or denitrogenation activity levels significantly, these catalysts will have to be recovered, stored or destroyed, when the specifications imposed on fuels become so restrictive that it is no longer possible to use them. This storage or this elimination of solids could also be subject to environmental and safety requirements and could result in significant additional costs for refiners.

The Applicant has therefore endeavored to make refractory oxide-based catalysts that include metals of groups VIB and VIII more effective by modifying them using new methods, in order to give them desulfidation and denitrogenation activity levels that are at least equivalent to those of the best catalysts on the market, and especially superior to their own activity level following regeneration.

All hydrotreating or hydrocracking catalysts are necessarily sulfidized before being used. This sulfidation can be done either in situ in the hydrotreatment reactor, or ex situ using hydrogen sulfide, mercaptans, sulfides, polysulfides and/or sulfur, in which these compounds are added alone, in a mixture with a solvent or at the same time as the load. Some of these catalysts are modified before sulfidation, and this modification consists of processing these catalysts using chelating, complexing or sulfidizing compounds. It is therefore a well-known process to modify these catalysts using thioglycolic-type acids or even thioalcohols, thioacetone compounds and thiodiazoles, or even thiocyanates, as proposed specifically in the following patents: EP 289211, EP 300629, EP 338788, EP 357295, EP 456592, EP 478365 and EP 506206. Other catalysts have been modified through processing using alcohol-acid organic compounds (EP 482817), mono-, di- or polyalcohols that could potentially be etherified (EP 601722, U.S. Pat. Nos. 3,954,673, 4,012,340, WO 01/76741), urea-type compounds, polyamines, EDTA, hydrazine and other nitrogen compounds (EP 181035, EP 335754, EP 1043069, WO 01/76741, U.S. Pat. Nos. 3,954,673 and 4,012,340).

All these modifications are intended to improve the efficacy of catalysts for hydrotreatment, and more specifically for desulfidation. However, these modifications do not always make it possible to obtain the sulfur contents required by the specifications expected to be reached in Europe by 2005 in average distillates from direct distillation or refined fractions, used as components in diesel fuel.

In some countries such as Sweden or the United States, and particularly in California, the total sulfur content of diesel oils is already limited to 0.005% by weight, and this limitation may become the norm eventually in the countries of the OECD. For Europe, this objective of 0.005% by weight of total sulfur must be reached by 2005, but there have already been discussions of 0.001% by 2010.

With this goal in mind, the Applicant has designed a new type of hydrotreatment catalysts with a based of refractory oxides and group VIB and VIII metals from the Periodic Table of the Elements, the performance of which will be improved in terms of desulfidation and/or denitrogenation.

Therefore, the first objective of this invention is a hydrocarbon hydroconversion catalyst, comprising a refractory oxide medium, at least one metal from group VIII and at least one metal from group VIB from the Periodic Table of the Elements, characterized in that in includes an organic compound with at least one oxime group.

The term "oxime group" refers to a group chosen from among the oxime and oxime ether groups according to the IUPAC standard, of the formula:

$$>C=NOR_1 \qquad (I)$$

where $R_1$ is chosen from among hydrogen, the alkyl, allyl, aryl, alkenyl or cycloaliphatic groups and combinations thereof, and these groups can be substituted by at least one electron donor group.

The term "free electron pairs" will be used below to refer to electron pairs that can be at the origin of covalent, dative or coordinative bonds with the transition metals present in the medium.

Indeed, the Applicant has established that the presence in the catalyst of an organic compound with at least one oxime group makes it possible, after sulfidation of the catalyst, to attain identical sulfur contents in hydrocarbons with a desulfidation reaction temperature that is at least 5 to 25° C. lower, all other operative conditions of the process (pressure, hydrogen quantity and volume velocity per hour (vvh)) being held constant. Such an increase in activity makes it possible to consider obtaining sulfur contents that are well below 50 ppm and even below 10 ppm in treated hydrocarbons, by varying these same operative conditions.

In order to obtain the organic compound described in the invention, it is possible to react an amine of formula (II) below

in which $R_1$ is chosen from among hydrogen, the alkyl, allyl, aryl, alkenyl or cycloaliphatic groups, and the combinations thereof, and these groups can be substituted by electron donor groups, with a carbonyl compound of formula (III) below

in which $R_3$ and $R_4$ are chosen (and can either be identical to or different from one another) from among hydrogen for only one of them, the linear, ramified or cyclic hydrocarbon groups of the alkyl, aryl, allyl and alkenyl type, and the combinations thereof, which could potentially be substituted by electron donor groups.

In one preferred method of implementing the invention, the amine of formula (II) is hydroxylamine and the compound of formula (III) is chosen from among the carbonyl compounds of the group formed by ketones and aldehydes.

It would not be outside the scope of the invention to use an organic compound from a synthesis according to the reactions described in the second edition of ORGANIC CHEMISTRY by Francis A. Carey, p. 698 and 712, and in Advanced Organic Chemistry, Reaction, Mechanisms and Structure by Jerry March (third edition).

In the context of this invention, the organic compound comprising this oxime group includes a principal carbonaceous chain consisting of 1 to 40 linear, ramified or partially or completely cyclized carbon atoms, that could potentially be interrupted by sulfur, nitrogen or oxygen heteroatoms or one or more oxime groups, and the carbon atoms can be substituted by hydrogen, by alkyl, aryl, allyl or alkenyl groups and the combinations thereof, by at least one oxime group and/or at least one hydroxyl, sulfidized or polysulfidized group, one thiol, thioacid, thioether or thioester group, one sulfone or sulfoxide group, one amine, amide or imine group, carbonyl, carboxyl, ether or ester groups, ketone or aldehyde groups, nitric groups, phosphines or any other group with free electron pairs.

In one preferred method of implementing the invention, the organic compound used in the invention includes a single oxime group.

Such a compound with a single oxime group, or monooxime, can be chosen from among the alkyloximes, alkenyloximes, allyloximes, aryloximes and the combinations thereof, alkanoneoximes, cycloalkyloximes, alkanaloximes and benzaldehyde oximes, whether or not they are substituted by alkyl, aryl, arylalkyl or alkylaryl groups.

In a first type of monooxime compound, the organic compound is chosen from the group consisting of 2-octanone oxime, 3-heptanone oxime, tricosanone oxime, heptanone oxime, phenyldodecanone oxime, 1,3-diphenylacetone oxime, benzophenone oxime, 2-phenylcyclohexanone oxime, fluorenone oxime, dimethylbenzaldehyde oxime, benzaldoxime, acetophenone oxime, methylphenanthryl oxime, 2 methylbenzaldehyde oxime, cyclooctanone oxime, 2-phenylcyclohexanone oxime, cyclohexanone oxime, o-ethylhexanone oxime, isobutyraldehyde oxime and acetone oxime.

In a second type of organic compound according to the invention, the organic compound includes one oxime group and at least one second group with free electron pairs.

Although this organic compound includes at least two oxime groups, the organic compound is chosen from among glyoxime, monoalkylglyoximes, dioximes and polyoximes that include alkyl, aryl, alkylaryl and arylalkyl groups. Among these compounds, the dioxime compounds will preferably be chosen from among glyoxime, monoalkyl and dialkyl oximes with carbonaceous chains with 1 to 10 carbon atoms that tolerate hydrogen and the alkyl, aryl, alkylaryl and arylalkyl groups. The preferred dioxime is dimethylglyoxime.

Although the second group of electron pair donors is not an oxime group, it can be chosen from among hydroxyl, sulfide and polysulfide groups, thiol, thioacid, thioether and thioester groups, sulfone and sulfoxide groups, amine, amide and imine groups, carbonyl, carboxyl, ether and ester groups, ketone and aldehyde groups, nitric groups, phosphines and any other group with free electron pairs.

More specifically, the organic compound is chosen from among mercaptoalkane oximes, alcoxybenzaldehyde oximes, alcoxyarylbenzaldehyde oximes, nitrobenzaldehyde oximes, alcoxybenzaldehyde oximes, hydroxybenzaldehyde oximes, alcoxybenzophenone oximes, substituted carboxaldehyde oximes, nitroarylalcanone oximes, aminobenzaldehyde oximes, benzamide oximes, substituted acetyl oximes, acetyl-furan, -theophene and -pyridine oximes, hydroxyalcanal oximes, amidooximes, acetophenone oximes, hydrazone oximes, polyalcanol oximes, and these groups could potentially be substituted by alkyl, aryl, arylalkyl, alkylaryl, pyridinyl, thiophenyl and furanyl groups, sulfides, alcoxyls, amines, cyanides, nitrates and hydroxyls.

Preferably, the compound will have one oxime group and at least a second group with free electron pairs, which will be chosen from among d-galactose oxime, benzamide oxime, benzyl oxime hydrazone, benzoichydrazide oxime, ethyl-2-oxobutyrate-2-oxime, 2,3 butanedione monooxime, isatine-3-oxime, ethyl(hydro-xyimino)cyanoacetate, di-2-pyridyl-ketone oxime, hydroxypentanal oxime, 4-pyriylamidooxime, nitrobenzaldehyde oxime, methoxybenzophenone oxime, hydroxybenzaldehyde oxime, dimethylaminobenzaldehyde oxime, 2-acetylpyridine oxime, 4-hexadecyloxybenzaldehyde oxime, methylthioacetaloxime, dimethoxy-nitrobenzaldehyde oxime, methoxyacetophenone oxime, methylbenzamide oxime, thiophenecarboxaldehyde oxime, acetylthiophene oxime, aminobenzo-phenone oxime, acetyl (methyl)thiophene oxime, 2-(4-methoxy-phenyl)glyoxal-1 oxime, 1-mercapto-propoane-2-oxime, aminophenyl-ethane oxime, (octyloxyphenyl)phenyl-methanone, acetylfurane oxime, acetonaphtoquinone oxime, 4-methoxy-3-nitrobenzaldehyde oxime, ethoxybenzaldehyde oxime, methoxybenzaldehyde oxime, 2-(4-methoxyphenyl)glyoxal 1-oxime, 1-mercapto-propan-2-one oxime, 1-(3-nitrophenyl)ethanone oxime, phenanthrene quinine-9-oxime, o-(4-nitrophenyl)acetone oxime, 2(3 or 4) pyridinaldoxime.

Preferably, the catalyst will be a catalyst consisting of a refractory oxide medium, alumina, silica and/or silica-alumina containing 0.1 to 10% of a metal from group VIII by weight, which would preferably be nickel and/or cobalt, and 1 to 20% of a metal from group VIB by weight, and preferably molybdenum.

The catalyst described in the invention preferably contains at least 0.001 mole of the organic compound containing at least one oxime group. More preferably, it contains from 0.001 mole to 10 moles of said compound per mole of metals from groups VIB and VIII.

A second objective of the invention is a process for preparing the hydrotreatment catalyst defined above, characterized in that the organic compound containing at least one oxime group, of commercial origin or obtained by synthesis, diluted in a solvent, preferably in a hydrocarbon mixture, is put in contact with the catalyst containing a refractory oxide medium, at least one metal from group VIII and at least one metal from group VIB, which is to say, with a traditional commercial catalyst.

In one particular method of implementing the invention, the organic compound containing at least one oxime group is the result of the reaction of a carbonyl compound of formula (III), which may or may not be contained in the hydrocarbons being processed, with an amine of formula (II), by maintaining the mixture at a temperature ranging from room temperature to 100° C., under pressure that is greater than or equal to atmospheric pressure.

In a first variation of the procedure, the organic compound is prepared in situ in the hydroconversion reactor, in the hydrocarbons being processed. For example, hydroxylamine is added to a hydrocarbon mixture that naturally contains carbonyl compounds, or in which synthetic carbonyl compounds have been diluted, before putting this mixture in contact with the catalyst.

In a second variation, the organic compound is prepared ex situ, which means outside of the hydroconversion reactor, and then is deposited or impregnated on the catalyst, and this deposit or impregnation can take place in the reactor or outside of it.

Of course, any variation of this procedure accessible to an expert in the field also falls within the scope of this invention.

A third objective of the invention is the use of the catalyst described in the invention in a hydrocarbon hydrotreating and/or hydrocracking procedure, after in situ or ex situ sulfidation of said catalyst using at least one compound chosen from among hydrogen sulfide, sulfur, $CS_2$, mercaptans, sulfides and/or polysulfides, and the hydrocarbon fractions, with a boiling point of less than 400° C., contain sulfide compounds or other compounds with a sulfidizing effect, and this compound can be added in the form of a gas or in diluted form in a solvent, or sometimes even as an additive of the load being hydrotreated.

The examples given below in this description are intended to illustrate and not limit the invention.

EXAMPLE 1

In this example, a method of preparing the catalyst according to the invention is described, and this catalyst is then used in the following example.

We begin with a commercial catalyst (catalyst A), consisting of a combination of 3% cobalt by weight and 10% molybdenum be weight in an alumina medium, available on the market and commonly used by refiners in hydrodesulfidation units intended to be impregnated by the "dry" method with dimethylglyoxime (DMG).

The granules of catalyst A are dried at 150° C. for four hours in a muffle furnace.

At the same time, in a reactor, a solution in methanol is prepared, containing 50 g/l of DMG. The methanol is heated to 50° C. while being stirred continuously. The DMG is then added and the stirring is maintained for a few minutes, until dissolution is complete.

Then, 100 g of dried catalyst A is placed in a 2000-ml Erlenmeyer flask, then 80 ml of the DMG solution in methanol are poured onto the catalyst; the volume of the solution must slightly exceed the porous volume of the catalyst. Finally, the mix thus obtained in the Erlenmeyer flask is stirred vigorously in order to ensure homogenous impregnation of all the granules of catalyst A. The mix is left to rest for maturation for three hours without stirring. Catalyst $C_i$ thus formed ex situ is filtered, and then placed in a tube furnace with nitrogen circulation to be dried in said furnace at 80° C. for 15 hours.

Once dry, catalysts A and $C_i$ are each loaded into a hydrotreating reactor, then sulfidized by a diesel fuel with a 2%-by-weight dimethyldisulfide (DMDS) additive according to a procedure recommended by the manufacturer of catalyst A.

EXAMPLE II

In this example, the activity levels of catalysts $C_i$ and A are compared to those of commercial catalyst B, after sulfidation, according to the procedure recommended by the manufacturer, which makes it possible to reach post-hydrotreatment sulfur contents of less than 10 ppm.

Catalyst B is a latest-generation Co/Mo catalyst in alumina that is currently the best performing catalyst on the market.

After a catalyst stabilization phase completed by passing it through pure diesel oil, a mix containing 75% diesel by weight and 25% a 220-350° C. hydrocarbon fraction by weight that is the result of catalytic cracking, usually called LCO (Light Cycle Oil), is added. The characteristics of this load are listed in Table I below.

TABLE I

| Load Type | 25% LCO - 75% GO Mix |
|---|---|
| Sulfur (ppm) | 14447 |
| Density at 15° C. (g/ml) | 0.8684 |
| Mono-aromatics (% by weight) | 18.7 |
| Di-aromatics (% by weight) | 14.8 |
| Tri-aromatics (% by weight) | 2.8 |
| Aromatics Total (% by weight) | 36.3 |
| Nitrogen (ppm) | 228 |
| Distillation according to standard ASTM D 86 (° C.) | |
| Initial point | 203 |
| 5 vol % | 230 |
| 10 vol % | 244 |
| 20 vol % | 257 |
| 30 vol % | 268 |
| 40 vol % | 278 |
| 50 vol % | 289 |
| 60 vol % | 301 |
| 70 vol % | 314 |
| 80 vol % | 329 |
| 90 vol % | 347 |
| 95 vol % | 359 |
| Final point | 363 |

The hydrotreating reaction is performed under pressure of $27 \times 10^5$ Pa (27 bars) with a hydrogen/hydrocarbon ($H_2$/HC) ratio of 130 Nl/l at a volume velocity per hour (vvh) of 1 $h^{-1}$.

In order to compare the desulfidation and denitrogenation activity levels, the reaction temperature is adjusted to reach either 98% desulfidation or 50% denitrogenation of the load. The higher this temperature, for a given catalyst, and the lower in comparison to the corresponding temperature for reference catalyst A, the more active this catalyst is in terms of desulfidation or denitrogenation.

For reference catalyst A, the reference temperatures $T_{HDS}$ and $T_{HDN}$, for hydrodesulfidation and denitrogenation, respectively, correspond to the temperatures required to reach 98% desulfidation and 50% denitrogenation.

Catalyst $C_i$ is prepared as described in Example 1. Catalyst $C_i'$ was prepared according to the in situ method in a 100-ml CATATEST pilot, in which a 50-g/l DMG solution was circulated in methanol at a volume velocity per hour of 4 $h^{-1}$, at atmospheric pressure and at room temperature, and then the entirety was left to mature for two hours.

TABLE II

| | | Catalyst | | |
|---|---|---|---|---|
| | A | $C_i$ | $C_i'$ | B |
| HDN | $T_{HDN}$ | −40° C. | −35° C. | −25° C. |
| HDS | $T_{HDS}$ | −23° C. | −21° C. | −22° C. |

As observed, catalysts $C_i$ and $C_i'$ as described in the invention have HDS and HDN activity levels that are significantly higher than those of the traditional catalyst A. Furthermore, compared to the best catalyst on the market, catalysts $C_i$ and $C_i'$ have an HDS activity level that is equivalent to that of commercial catalyst B. Another observation is that $C_i$ and $C_i'$ have an HDN activity level that is significantly greater, which can be a guarantee of the stability of the catalyst over time, as nitrogen is indeed a deactivation factor for hydrotreatment catalysts.

The invention claimed is:

1. A hydrocarbon hydroconversion catalyst, comprising a medium with a base of at least one refractory oxide selected from the group consisting of alumina, silica and silica-alumina, wherein the at least one refractory oxide contains 0.1 to 10% by weight of at least one metal of group VIII, and 1 to 20% by weight of at least one metal of group VIB by weight on the Period Table of the Elements; and at least one organic compound with at least two oxime groups of the formula:

$$>C=NOR_1 \quad (I)$$

where $R_1$ is chosen from among a hydrogen atom, alkyl, allyl, aryl, alkenyl or cycloaliphatic groups, and combinations thereof, and one or more of said groups can be substituted by at least one electron donor group.

2. The catalyst described in claim 1, wherein the organic compound is the result of the reaction of an amine of formula (II) below

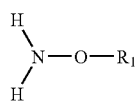
(II)

in which $R_1$ is chosen from among a hydrogen atom, alkyl, allyl, aryl, alkenyl or cycloaliphatic groups, and combinations thereof, and one or more of said groups can be substituted by an electron donor group, with a carbonyl compound of formula (III) below

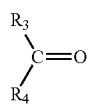
(III)

where $R_3$ and $R_4$, which are either identical to or different from one another, are chosen from among hydrogen, for only one of them, linear, ramified or cyclic alkyl, aryl, allyl or alkenyl groups, and combinations thereof, which themselves can be substituted by electron donor groups.

3. The catalyst described in claim 2, wherein the amine of formula (II) is hydroxylamine.

4. The catalyst described in claim 2, wherein the carbonyl compound of formula (III) is chosen from among carbonyl compounds that are naturally present in a hydrocarbon charge that is the result of the distillation of crude oil, or ketones and aldehydes.

5. The catalyst described in claim 1, wherein said organic compound has a principal carbonaceous chain of 1 to 40 carbon atoms that is linear, ramified or partially or completely cyclic, that can be interrupted by heteroatoms chosen from among sulfur, nitrogen or oxygen, and the carbon atoms can be substituted by a hydrogen atom, alkyl or aryl groups, at least one oxime group, at least one hydroxyl, sulfide or polysulfide group, a thiol, thioacid, thioether or thioester group, sulfone or sulfoxide groups, amine, amide or imine groups, carboxyl, ether or ester groups, ketone or aldehyde groups, nitrate groups, phosphines or any other group with a free electron pair.

6. The catalyst described in claim 1, wherein said organic compound is chosen from among dioximes and polyoximes comprising one or more alkyl, aryl, alkylaryl and arylalkyl groups.

7. The catalyst described in claim 6, wherein said organic compound is chosen from among glyoxime, monoalkylglyoximes, dialkyloximes and polyoximes with carbonaceous chains including 1 to 10 carbon atoms that tolerate hydrogen and alkyl, aryl, alkylaryl and arylalkyl groups.

8. The catalyst described in claim 7, wherein said compound is dimethylglyoxime.

9. The catalyst described in claim 1, comprising at least 0.001 mole of said organic compound per mole of metal from groups VIB and VIII.

10. The catalyst described in claim 9, comprising from 0.001 to 10 moles of said organic compound.

11. A process for preparing the catalyst described in claim 1, comprising contacting a catalyst in a medium of a base of at least one refractory oxide, at least one metal of group VIII and at least one metal of group VIB with the organic compound of claim 1, as a gas, diluted in a solvent, and/or in a hydrocarbon charge, to form the catalyst of claim 1.

12. The process described in claim 11, wherein said organic compound is a synthesized compound, obtained by reacting a carbonyl compound of formula (III), which may or may not be contained in the hydrocarbon charge being processed, with an amine of formula (II), by maintaining the mixture at a temperature between room temperature and 100° C., under pressure that is at least equal to atmospheric pressure.

13. The process described in claim 11, wherein said organic compound is prepared in situ in a hydroconversion reactor, in the hydrocarbon charge being processed.

14. The process described in claim 11, wherein the organic compound is prepared ex situ, and then deposited or impregnated on the catalyst.

15. A hydrocarbon hydrotreatment and/or hydrocracking process, after in situ or ex situ sulfidation of a catalyst of claim 1 without said organic compound, using at least one sulfide compound chosen from among hydrogen sulfide, sulfur, $CS_2$, mercaptans, sulfides and/or polysulfides or hydrocarbon fractions with a boiling point of less than 400° C. containing sulfur compounds, or other compounds with a sulfidizing effect, comprising contacting said catalyst with the organic compound of claim 1 in the form of a gas or in diluted form in a solvent, and passing a hydrocarbon charge to be hydrotreated and/or hydrocracked over said catalyst, wherein the organic compound can be provided as an additive of the hydrocarbon charge being converted, in addition to or in lieu of contacting the catalyst with compound in the form of a gas or in diluted form in a solvent.

* * * * *